2,863,916
PROCESS FOR MAKING PERHALOACYLHALIDES

Jared W. Clark, Charleston, and Charles E. Rectenwald, South Charleston, W. Va., assignors to Union Carbide Corporation, a corporation of New York No Drawing. Application July 15, 1953
Serial No. 368,224

2 Claims. (Cl. 260—539)

This invention relates to a method for producing perhaloacylhalides and the corresponding perhaloalkanoic acids.

Perfluoroalkanoic acids made by the Simons method are available at present only in limited quantities and at very high prices which limits their adaptation in the synthesis of esters, solvents, hydraulic fluids, heat transfer media and the like. Accordingly, there is a need for an improved method of making acids of this type.

Our method makes possible the economical production of a new type of perhaloalkanoic acids. By our method, perhaloacylhalides are produced from which the corresponding acids are readily derived by hydrolysis. Our perhaloacylhalides contain chlorine in the molecule in addition to fluorine and have the formula:

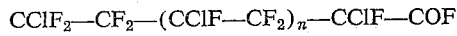

$$CClF_2-CF_2-(CClF-CF_2)_n-CClF-COF$$

where $n$ is 0 or an integer, such as 1, 2, 3, 4, 5, 6, 7, or higher, up to about 10 to 15.

Our method for making such perhaloacylhalides comprises heating polymeric chlorotrifluoroethylene to between 250° C. to 375° C. to form a body of molten polymer, passing a gas containing an excess of oxygen through said molten polymer, removing from the zone of oxidation a gaseous mixture containing unreacted oxygen and oxidation products of said polymer, and recovering perhaloacylhalides from said oxidation products as by distillation, extraction, hydrolysis or washing with alkali. When these latter methods of recovery are used, the perhaloacylhalides are not recovered as such, but in the form of their acids or salts.

It has previously been proposed to form monomeric chlorotrifluoroethylene by heating its polymer at temperatures above its decomposition point, i. e. from 400° C. to 700° C., in the presence of an inert atmosphere. It has also been suggested to carry out such pyrolysis reaction in the presence of air or oxygen, but at the high temperatures involved, the principal product is the monomer and only trace yields of acidic materials are obtained. On the other hand, our oxidation process is carried out at such temperatures and under such conditions that no substantial amounts of monomer are formed and good yields of perhaloalkanoic acids result. Our process involves the use of an excess of oxygen so that a strongly oxidizing atmosphere is maintained over the molten polymer and the oxidation products are swept out of the oxidation zone with the excess oxidizing gas. Thus, our process involves the scission of carbon to carbon bonds at irregular intervals along the polymer chain under the combined influence of heat and oxygen, and the immediate stabilization of the polymer fragments formed by reaction with oxygen to form perhaloacylhalides.

The polymeric materials which are suitable starting materials for the production of these perhaloacylfluorides may be any of a number of polymeric chlorotrifluoroethylenes ranging from the commercial molding-grade resins of high-molecular weight and high melting point of 300° C. or higher to waxes and oils. Scrap polymers, obtained as a result of polymerization or fabrication operations are also suitable starting materials and have the added advantage of lower cost in comparison to the commercial molding grade material.

The oxidation reaction is readily carried out in a standpipe reactors made of glass or corrosion-resistant metal or in stirred autoclaves which are equipped with suitable gas inlet and outlet ports in addition to the usual charging ports, thermometer wells and the like. The preferred procedure is to charge the polymer to the reactor, apply heat until the polymer is melted and then admit air or oxygen to the reactor. The oxidizing gas is fed to the reactor at such a rate as to maintain an excess of oxygen in the effluent gas. A large excess can be used to assist the removal of the volatile products from the reactor before they can undergo further reaction to lower molecular weight products. On the other hand, low-molecular weight products are obtained readily by recycling the volatile products through the reactor.

As further shown in the examples, the residence time of the oxidizing gas in the reactor is quite short, being in the range of 5 to 45 seconds. Thus, the oxidized products are quickly removed from the zone of oxidation.

The discharge gas which carries the volatile products from the reactor is conducted successively through a series of water-cooled condensers and entrainment separators, thence through cooled traps to the exhaust. A major portion of the exhaust gas which contains significant quantities of unreacted oxygen may be taken from the vent stream and returned to the reactor for further utilization of the contained oxygen. Make-up oxygen may be added to this recycled gas or admitted independently to the reactor.

The condensate obtained as above can be separated by distillation into fractions boiling within desired limits. Residue material from the reactor can also be fractionated although its low volatility may make separation by solvent extraction more convenient than distillation.

The method of making and using the perhaloalkanoic acids of this invention is further referred to in copending application, Serial No. 375,301, filed August 19, 1953, now Patent No. 766,215, "Process for Polymerizing Chlorotrifluoroethylene," owned by the same assignee as the present application, which application refers also to the present application.

The following examples will serve to illustrate the invention:

EXAMPLE 1

Approximately 5000 grams of liquid chlorotrifluoroethylene polymer were placed in a five-liter flask which was equipped with a mechanical stirrer. The flask was heated to between 330° C. and 350° C. and oxygen was introduced to the vigorously stirred contents at the rate of approximately 16 liters per hour. The volatile products from the reactor were conducted through a gooseneck connection successively to an air-cooled receiver, a water-cooled condenser, traps cooled with solid $CO_2$ and then exhausted to the air. During the 4.7 hours of operation, 1985 grams of granular polychlorotrifluoroethylene resin were added in small increments to the reactor to maintain a nearly constant resin volume and 4165 grams of volatile products were collected in the receivers and traps. Distillation of the volatile products yielded 1757 grams of material boiling below 50° C. at 1 mm. pressure and 2393 grams of higher boiling-point material. About 2750 grams of partially oxidized polymer was recovered from the reactor. The degree of acidity of the higher boiling (50° C./1 mm.) fraction in terms of milliliters of one-normal alkali per 100 grams of sample was 133.

EXAMPLE 2

Approximately 5300 grams of polychlorotrifluoroethylene polymer, having a melting point of about 140° C., was charged to a nickel reactor tube of 3 inches internal diameter by 48 inches in height. The reactor was heated electrically to between 325° C. to 350° C. and oxygen was admitted at about 180 liters per hour through a tube extending through the molten resin to the bottom of the reactor. The effluent gas from the reactor was passed through a water-cooled condenser and receiver and then recycled through the reactor at a rate of approximately 1000 liters per hour. A purge of recycled gas equivalent to the oxygen feed was vented to the atmosphere through a series of traps cooled with solid $CO_2$. The resin volume in the reactor was maintained at a nearly constant value by the periodic addition of granulated scrap polychlorotrifluoroethylene resin (M. P. above 300° C.).

During the 5 hours of operation, 1290 grams of resin was added, 1260 grams of liquid product was obtained from the receiver and 305 grams of low-boiling product collected in the traps. A 35-gram fraction of the low-boiling product was boiled at −20° C. to −10° C. at 760 mm. pressure was identified by mass-spectrometer analysis as chlorodifluoroacetyl fluoride. Titration of samples of fractions of the liquid product boiling between 115° C. at 20 mm. pressure and 260° C. at 1 mm. pressure indicated the degree of acidity in milliliters of standard (1.0 N) caustic per 100-gram sample ranged from 129 for the lower-boiling fractions to 43 for the higher-boiling fractions.

EXAMPLE 3

Partially oxidized chlorotrifluoroethylene polymer (4628 grams) having a melting point of 60° C. to 170° C., which was obtained from an earlier oxidation experiment, was charged to a 5-liter flask and reacted with oxygen at 370° C. in a manner similar to that described in Example 1. Oxygen was fed to the reactor at about 120 liters per hour and the effluent gas was recycled at an estimated rate of 500 liters per hour. During the 4 hours of operation, 3551 grams of granulated scrap polymer (polychlorotrifluoroethylene) was added to the reactor, 5427 grams of volatile product was collected and 2185 grams of partially oxidized polymer (M. P. 160° C.–170° C.) was recovered from the reactor. Distillation of the volatile product gave 2530 grams of material boiling below 50° C. at 1 mm. pressure, 2599 grams of material boiling between 50° C. at 1 mm. pressure and 290° C. at 3 mm. pressure and 187 grams of residue product. The fraction boiling between 50° C. and 290° C. showed an acidity of 173 ml. of 1.0 normal caustic per 100 grams of sample.

EXAMPLE 4

The reactor tube described in Example 2 was modified by charging it with 3150 ml. of 2 x 4 aloxite (aluminum oxide) and 2000 ml. of ⅛ inch nickel Raschig rings. It was fitted with an external reservoir, centrifugal pump and liquid recycle line connected to the top of the reactor. By this means, chlorotrifluoroethylene polymer, liquefied by the temperature of the reactor, was continuously recycled to the packed column. The temperature within the column was maintained at about 310° C. to 360° C. The gaseous effluent from the top of the reactor, after passing through a series of water-cooled condensers, was recycled to the bottom of the packed column at a rate of about 1000 liters per hour. Oxygen was fed to this gas recycle system at a rate of about 30 liters per hour. Low-boiling products were condensed in traps cooled with solid $CO_2$ in the vent line.

The reactor was operated under these conditions for 3.5 hours during which time a total of 6564 grams of polymer (M. P. 107° C.) was fed to the reactor liquid cycle. Oxidized product collected during this period amounted to 2491 grams of liquid condensate from the water-cooled condensers, 384 grams of low-boiling liquid and gases from the traps cooled with solid $CO_2$ and 3123 grams of partially oxidized polymer was drained from the reservoir. About 2700 grams of the condensate from the water-cooled condensers boiled above 50° C. at 1 mm.

EXAMPLE 5

Oxidation products obtained from a series of operations similar to Example 2 were distilled in a laboratory column. Fractions were isolated at 20° C. intervals between 50° C. at 1 mm. pressure and 184° C. at 1 mm. pressure. These portions were then hydrolyzed with hydrochloric acid and further extracted with additional hydrochloric acid to remove hydrofluoric acid from the product. The perhaloalkanoic acids thus formed were then separated from the residual unoxidized polymer by distillation, the boiling point of the perhaloalkanoic acid being about 40° C. above that of the original fraction. Acidity values were determined on the acid fraction by titration with standard alkali and are recorded in Table I.

*Table I*

| Oxidized Oil Fraction | | Isolated Carboxylic Acid | | |
|---|---|---|---|---|
| Boiling Range, °C./mm. | Wt. of Fraction in Grams | Boiling °C./mm. | Wt. of Fraction in Grams | Degree of Acidity in ml./N NaOH/100 grams |
| 50–70/1 | 401 | 110–119/0.5 | 59 | 230 |
| 70–90/1 | 293 | 125–135/1.5 | 38 | 195 |
| 90–110/1 | 668 | 140–145/0.5 | 96 | 193 |
| 110–130/1 | 484 | 140–152/0.3 | 36 | 113 |
| 130–150/1 | 652 | 165–180/0.4 | 76 | 154 |
| 150–158/0.4 | 706 | 200–205/0.3 | 102 | 121 |
| 158/0.4–184/0.8 | 1,162 | 195–207/0.5 | 238 | 102 |

Dicarboxylic acids present in these fractions account for the random values obtained for degree of acidity. However, considering the whole range, these effects are not so pronounced, and the average molecular weights of the acids are in the range from about 400 to about 1000.

EXAMPLE 6

A 738 gram fraction of crude oxidation product obtained in a method similar to Example 5 and boiling at 120° C. to 140° C. was placed in a section of a 2-inch nickel pipe closed at one end. About 33 grams of water was added and a stream of nitrogen was passed through the liquid to provide agitation. The pipe was electrically heated to 80° C. to 130° C. Hydrogen fluoride, a product of the reaction between the water and the acyl fluoride, was removed as a gaseous effluent. Distillation of the hydrolyzed product gave the following fractions:

| Boiling Range, °C./mm. pressure | Weight, Grams | $n_D^{23}$ | Degree of Acidity in ml./N NaOH/100 Grams |
|---|---|---|---|
| 120°–143°/760 | 306 | | |
| 85°–106°/10 | 40 | | |
| 106°–111°/10 | 10 | 1.3826 | |
| 111°–116°/10 | 34 | 1.3914 | 544 |
| 116°–125°/10 | 146 | 1.3850 | 439 |
| Residue | 22 | | |

The indicated degree of acidity of the fraction distilling at 116° C.–125° C./10 mm. corresponds to a molecular weight of 228. A molecular weight determination based on the elevation of the boiling point of acetone gave a value of 209. Analysis indicated that this material contained 20.5% carbon, 28.6% chlorine, 42.8% flourine and 0.7% hydrogen. These results approximate the theoretical values for a four-carbon acid corresponding to the structural formula $CClF_2$—$CF_2$—$CClF$—$COOH$ as indicated below.

|  | Theory | Found |
|---|---|---|
| Carbon | 19.4 | 20.5 |
| Chlorine | 28.7 | 28.6 |
| Fluorine | 38.5 | 42.8 |
| Hydrogen | 0.4 | 0.7 |
| Molecular weight | 247 | 228 |

What is claimed is:

1. Process for making perhaloacylfluorides which comprises heating polymeric chlorotrifluoroethylene to between 250° C. and 375° C. to form a body of molten polymer, passing a stream of gases containing oxygen through said molten polymer and continuously removing from the zone of oxidation a gaseous mixture substantially free of monomeric chlorotrifluoroethylene and containing unreacted oxygen and oxidation products of said polymer, and recovering perhaloacylfluorides from said oxidation products.

2. Process for making perhaloacylfluorides which comprises heating polymeric chlorotrifluoroethylene to between 250° C. and 375° C. to form a body of molten polymer, passing oxygen through said molten polymer and continuously removing from the zone of oxidation a gaseous mixture substantially free of monomeric chlorotrifluoroethylene and containing unreacted oxygen and oxidation products of said polymer, recovering perhaloacylfluorides from said oxidation products, and recycling the unreacted oxygen to the oxidation zone.

References Cited in the file of this patent

UNITED STATES PATENTS

| 2,456,768 | Chaney | Dec. 21, 1948 |
| 2,567,011 | Diesslin et al. | Sept. 4, 1951 |
| 2,676,983 | Hurka | Apr. 27, 1954 |
| 2,766,215 | Stoops et al. | Oct. 9, 1956 |